Oct. 7, 1958  R. A. COCHRANE  2,855,221
FIFTH WHEEL COUPLING
Filed Aug. 11, 1955  4 Sheets-Sheet 1
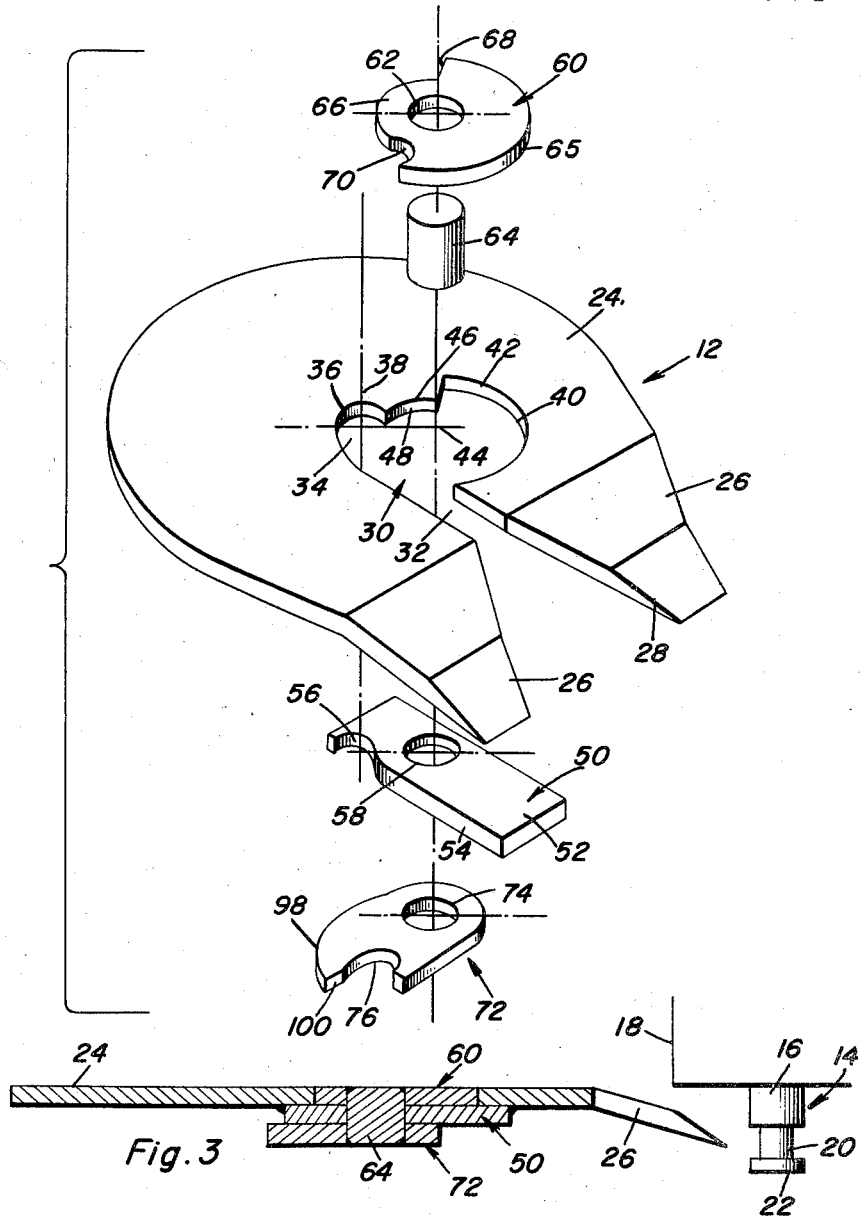
Reuel A. Cochrane
INVENTOR.
BY 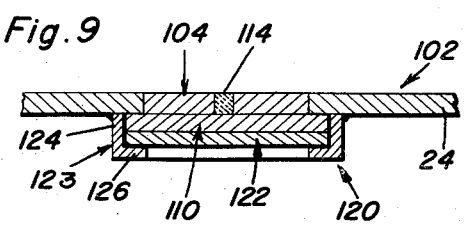
Attorneys

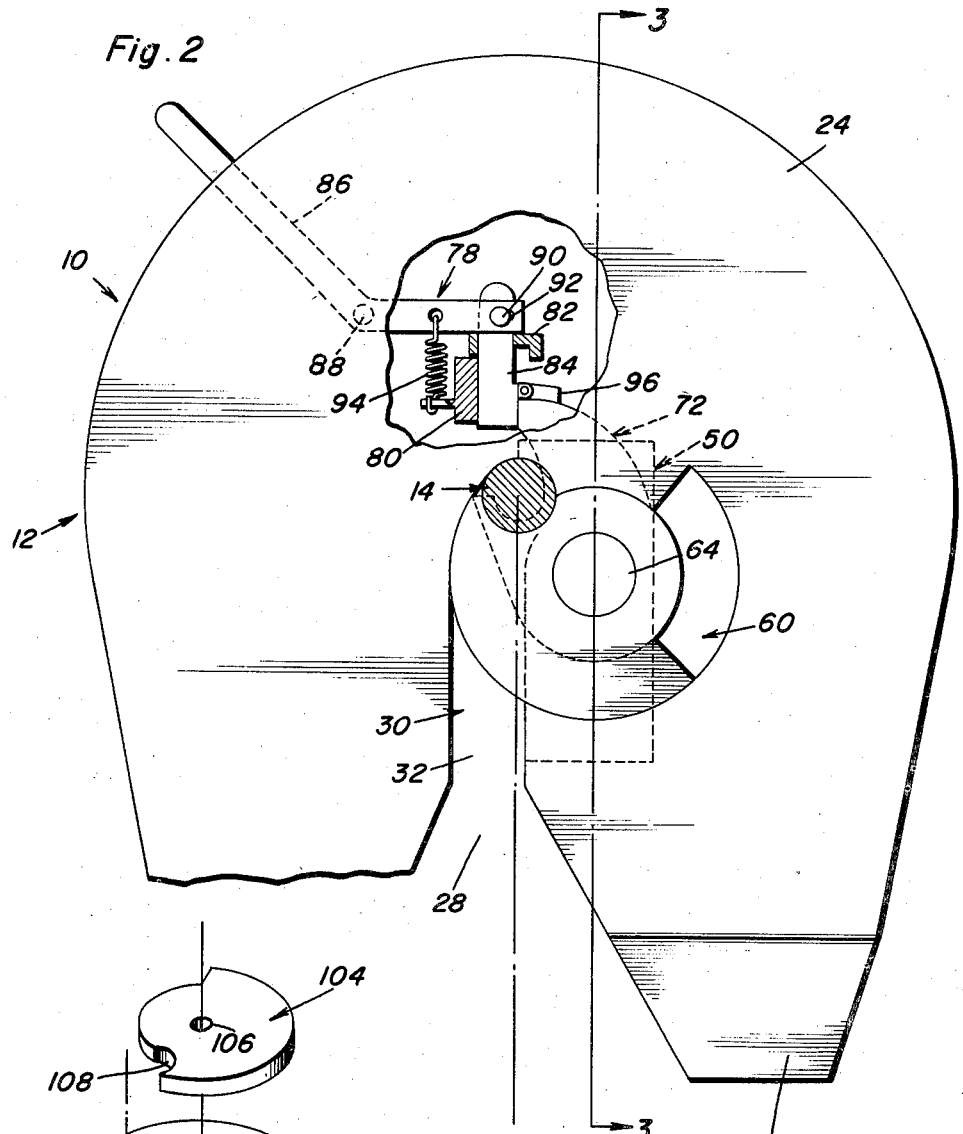
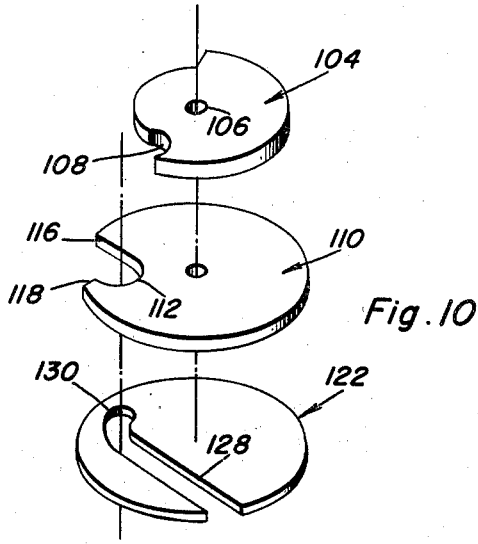

Reuel A. Cochrane
INVENTOR.

Oct. 7, 1958  R. A. COCHRANE  2,855,221
FIFTH WHEEL COUPLING
Filed Aug. 11, 1955  4 Sheets-Sheet 4

Reuel A. Cochrane
INVENTOR.

United States Patent Office 2,855,221
Patented Oct. 7, 1958

2,855,221

FIFTH WHEEL COUPLING

Reuel A. Cochrane, Chilesburg, Va., assignor of one-half to The Gamble Company, Inc., Fairmont, Minn., a corporation of Minnesota Application August 11, 1955, Serial No. 527,768

15 Claims. (Cl. 280—434)

This invention relates in general to new and useful improvements in automotive equipment, and more specifically to an improved fifth wheel assembly.

The usual fifth wheel assembly includes a coupler and a kingpin. The kingpin depends from the trailer and includes an enlarged upper portion, a reduced lower portion and enlarged head at the lower end thereof. When the kingpin is engaged with the coupler, the enlarged upper portion is guidingly engaged with a coupler body, and the reduced lower portion is engaged by the lock mechanism of the coupler. The head also engages the lock mechanism and prevents upward withdrawal of the kingpin. From the foregoing, it will be readily apparent that the shear load on the kingpin is applied at its weakest point, that is, the lower reduced portion. Further, inasmuch as the lower reduced portion is disposed below the trailer, it will be readily apparent that a relatively great amount of moment is set up, tending to break the connection between the kingpin and the trailer. Because of the recent heavy loads possible with the latest types of trailers, it has now been found necessary to increase the size of the kingpin, this being particularly due to the improper relationship between the coupler and the kingpin.

It is therefore the primary object of this invention to provide a fifth wheel coupler which is so constructed whereby it will so engage a conventional type of kingpin in such a manner that the effective strength of the kingpin is greatly increased so that the same size kingpin now in use may be utilized on the heavy load type trailers.

Still another object of this invention is to provide an improved fifth wheel coupler which is so constructed whereby that part of the coupler which takes the main force imposed thereon by the kingpin will engage the enlarged upper portion of the kingpin, thereby placing the shear load on the thickest portion of the kingpin and at the same time, greatly reducing, if not completely doing away with, the moment on the connection between the kingpin and the trailer.

Still another object of this invention is to provide a fifth wheel coupler of the type which utilizes a conventional type of coupler body, the coupler body being provided with a slot for receiving the enlarged upper portion of the kingpin and having mounted therein adjacent the slot a coupler plate which is engageable with the enlarged upper portion of the kingpin so that the load from the coupler body may be directly imposed upon the kingpin in the plane of the coupler body.

A further object of this invention is to provide an improved fifth wheel coupler which is of an extremely simple construction and at the same time, will permit greater loads with the same type of kingpin, the improved fifth wheel coupler being of extremely simple construction and being of such a nature whereby the manufacture thereof is economically feasible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an exploded perspective view of a preferred form of fifth wheel coupler, and shows the specific details of the various components thereof;

Figure 2 is a top plan view of the fifth wheel coupler of Figure 1 with the various parts thereof assembled and operatively engaging a kingpin, the kingpin being shown in section, a portion of the coupler body being broken away in order to specifically illustrate the details of the latch mechanism for locking the coupler mechanism in a kingpin retaining position;

Figure 3 is a transverse vertical sectional view taken substantially upon the plane indicated by the section line 3—3 of Figure 2 and shows the specific details of the relationship of the various components of the fifth wheel coupler;

Figure 9 is a fragmentary vertical sectional view taken through a modified form of fifth wheel coupler; and Figure 10 is an exploded perspective view of the main components of the modified form of fifth wheel coupler.

Figure 4:
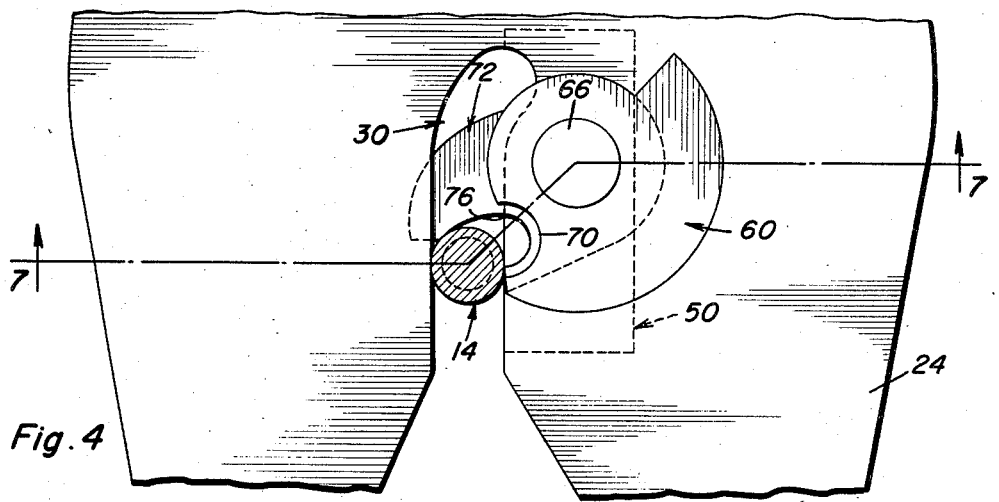
Figure 4 is a fragmentary plan view of the fifth wheel coupler with a kingpin shown in section, the kingpin being illustrated in an initial coupler engaging position.

Referring now to the drawings in detail, it will be seen that there are illustrated details of an improved fifth wheel assembly which is referred to in general by the reference numeral 10. The fifth wheel assembly 10 includes an improved coupler, which is referred to in general by reference numeral 12, and a conventional type of kingpin, which is referred to in general by reference numeral 14.

Referring now to Figure 3 in particular, it will be seen that the kingpin 14 includes an enlarged upper portion 16 which is secured directly to a trailer, which is referred to by the reference numeral 18. Disposed below the enlarged upper portion 16 is a reduced lower portion 20. Connected to the lower end of the lower portion 20 is an enlarged head 22.

Referring now to Figure 1 in particular, it will be seen that the improved coupler 12 includes a coupler body 24. The coupler body 24 is of the same general type as the conventional coupler body, and includes a pair of rearwardly extending ramps 26. Disposed between the ramps 26 is a forwardly converging entrance opening 28 which terminates in a longitudinally disposed slot 30. The slot 30 includes a longitudinally extending entrance opening 32 which terminates at its forward end in a curved portion 34 which in turn terminates in a socket portion 36. It is to be understood that the socket portion 36 is centered about the center of the coupler body, the center being referred to in general by the reference numeral 38.

Disposed immediately adjacent the slot 30 is an enlarged opening 40. The opening 40 is bounded primarily by a circular wall part 42 which is symmetrical about a center 44, the center 44 being offset relative to the center 38. It is to be noted that the opening 40 communicates with the slot 30.

Projecting into the opening at generally the forward end thereof is a stop portion 46. The stop portion 46 forms a boundary of the opening 40 and includes a wall part 48 which is centered about the center 44. The socket 36 is also formed as part of the stop portion 46.

Secured to the underside of the coupler body 24 is a support bracket which is referred to in general by the reference numeral 50. The support bracket 50 is in the form of an elongated rectangular plate 52 having a side edge 54. Formed in the forward part of the side edge 54 is a socket portion 56. When the support bracket 50 is properly secured to the underside of the coupler body 24, the side edge 54 thereof is aligned with one edge of the slot 30 and the socket portion 56 is aligned with the socket portion 36.

The support bracket 50 also includes a cylindrical bore 58 therethrough. The bore 58 is centered with respect to the center 44 of the opening 40.

Positioned within the opening 40 and seated on the support bracket 50 is a coupler plate which is referred to in general by the reference numeral 60. The coupler plate 60 includes a centrally disposed cylindrical bore 62 which receives an upper end of a pin 64, the pin 64 being rigidly secured to the coupler plate 60 for rotation therewith. The pin 64 is passed through the bore 58 so as to properly position the coupler plate 60.

The coupler plate 60 includes a circular peripheral part 65 which is disposed concentric with the bore 62. The coupler plate 60 also includes a circular peripheral part 66 which is concentric with the bore 62 and which is of a lesser diameter than the peripheral part 65. The peripheral parts 65 and 66 are connected together by a flat part 68 and a socket portion 70.

It is to be understood that the peripheral part 65 has the same radius of curvature as the wall 42 of the opening 40. Further, the peripheral part 66 has the same radius of curvature as the wall part 48. The socket portion 70 is complementary with the socket portion 36 and opposed with respect to the socket portion 36 when the coupler plate 60 is properly positioned.

The coupler also includes a lock plate which is referred to in general by the reference numeral 72. The lock plate 72 includes a bore 74 which receives the lower end of the pin 64, the pin 64 also being referred to as a coupler spindle. The pin 64 is rigidly secured to the lock plate 72 so that the lock plate 72, the pin 64 and the coupler plate 60 rotates as a unit. Formed in the lock plate 72 remote from the bore 74 is a socket portion 76. The socket portion 76 is provided with a common axis with the socket portion 70, but is of a reduced size.

Secured to the underside of the coupler body 24 adjacent the support bracket 50 is a latch mechanism which is referred to in general by the reference numeral 78. The latch mechanism 78 includes a guide plate 80 and a guide member 82 which are secured to the underside of the coupler body 24 in depending relation. Extending through the guide member 82 and mounted for longitudinal sliding movement at the underside of the coupler body 24 is a latch member 84. The latch member 84 engages the guide plate 80 and is prevented from twisting by the guide plate 80 which also functions as a stop.

In order to effect sliding movement of the latch member 84, there is provided a generally L-shaped lever 86. The lever 86 includes an intermediate pivot 88 and a connecting pin 90, the connecting pin 90 extending through a transversely elongated slot 92 and connecting the lever 86 to the latch member 84. Connected to the lever 86 intermediate the pivot pin 88 and the connecting pin 90 is a tension spring 94 whose opposite end is connected to the guide plate 80. The tension spring 94 urges the latch member 84 into an operative position, such as is illustrated in Figure 2.

Carried by the latch member 84 in the side thereof opposite from the side which engages the guide plate 80 is a pivotally mounted lock-out bar 96. The lock-out bar 96 is engageable with the guide member 82 and actuated thereby. It is to be noted that the lever 86 extends outwardly of the coupler body 24 for ease of manipulation.

Figure 5:
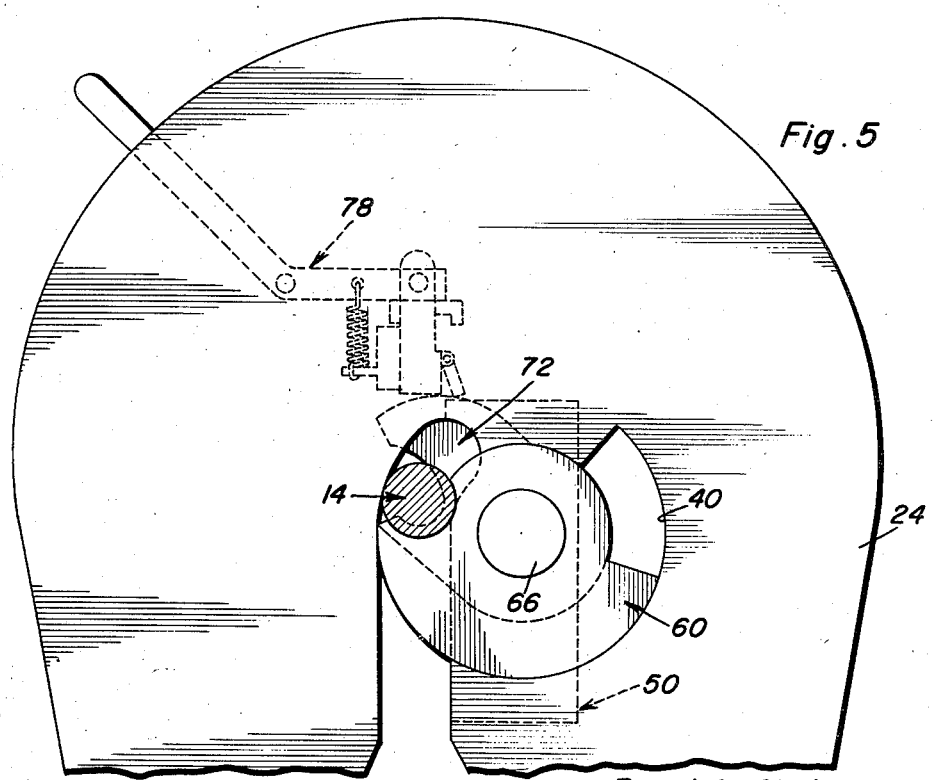
Figure 5 is an enlarged fragmentary top plan view similar to Figure 4 and shows a kingpin advanced toward its final locked position of Figure 2.

In the operation of the fifth wheel assembly 10, the tractor (not shown) carrying the coupler 12 is backed towards the trailer 18 and aligned with the kingpin 14 so that the kingpin 14 will pass into the entrance opening 28. The kingpin 14 will then pass into the slot 30, at which time the lower portion 20 thereof will engage the lock plate 72, as is generally illustrated in Figure 4. Further rearward movement of the tractor will result in the rotation of the latch plate 72 by the kingpin 14. Inasmuch as the latch plate 72 is connected to the coupler plate 60 by the coupler spindle 64, the coupler plate 60 will be rotated likewise. Further rearward movement of the coupler 12 will result in the partial seating of the upper portion 16 of the kingpin 14 in the socket portion 70, as is best illustrated in Figure 5. At the same time, the lower portion 20 of the kingpin 14 will become partially seated in the socket portion 76.

Figure 6:
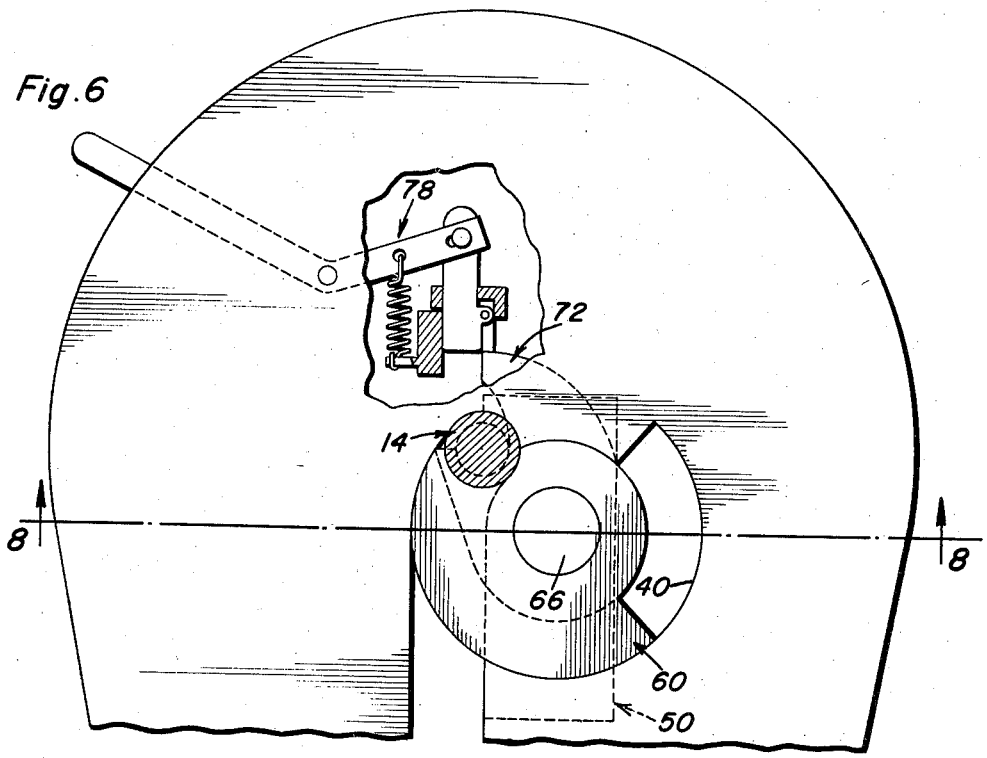
Figure 6 is an enlarged fragmentary plan view of the fifth wheel coupler, the view being similar to Figure 2, but showing the latch mechanism being in a released position.
Figure 7:
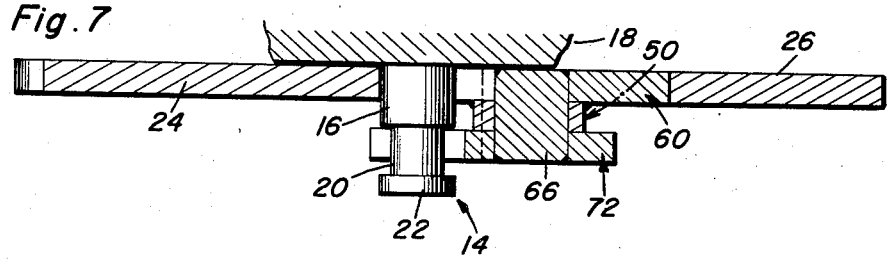
Figure 7 is an enlarged transverse vertical sectional view taken substantially upon the plane indicated by the section line 7—7 of Figure 4.
Figure 8:
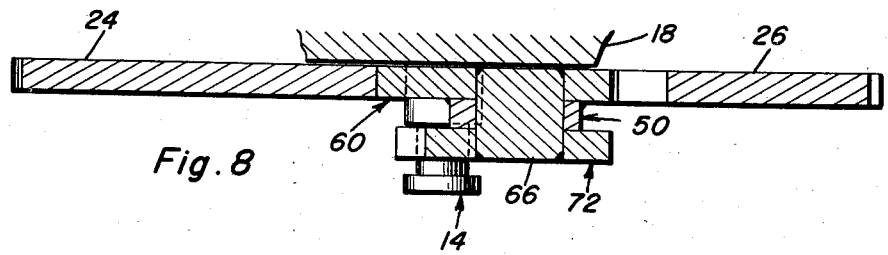
Figure 8 is an enlarged vertical sectional view taken substantially upon the plane indicated by the section line 8—8 of Figure 6.

Further rearward movement of the coupler 12 with respect to the kingpin 14 will result in the movement of the kingpin 14 to that position illustrated in Figure 6. At this time, the enlarged upper portion 16 of the kingpin 14 is positioned in the socket formed by the socket portions 36 and 70. Further, a lower part of the upper portion 16 will be positioned in the socket portion 56 while the lower portion 20 will be positioned in the socket portion 76. The head 22 will engage the underside of the lock plate 72 and prevent upward movement of the kingpin 14 with respect to the coupler 12.

From the foregoing, it will be readily apparent that when the kingpin 14 is properly seated with respect to the coupler 12, the upper portion 16 thereof will engage both the coupler plate 60 and the support bracket 50 and will be restrained against rearward movement thereby. At the same time, a slight contact will be maintained between the lock plate 72 and the lower portion 20. Therefore, substantially all of the shear loading on the kingpin 14 is applied against the enlarged upper portion 16 which is the strongest part of the kingpin 14. Further, inasmuch as the shear loading is placed on the upper portion of the kingpin 14, the moment on the connection between the kingpin 14 and the trailer 18 is greatly reduced and becomes of an insignificant nature. Other than the desired simplicity of the construction of the present invention, these are the important features of this invention inasmuch as they permit a conventional size of kingpin to take greater loads.

Referring now to Figure 5 in particular, it will be seen that an arcuate edge portion 98 of the lock plate 72 engages the latch member 84 and moves it to an inoperative position when the lock plate 72 is rotated. The lock plate 72 is provided with a flat part 100 immediately adjacent the socket portion 76 and between the socket portion 76 and the arcuate part 98. When the lock plate 72 has been rotated to a kingpin retaining position, such as that which is illustrated in Figure 2, the arcuate part 98 will clear the latch member 82 and it will slide into position engaging the flat part 100. The lock-out bar 96 will be swung to its position of Figure 2 by the engagement thereof with the arcuate part 98.

When it is desired to release the kingpin 14, it is merely necessary to pivot the lever 86 to the position best illustrated in Figure 6. At this time, the lock-out bar 96 is swung into face-to-face engagement with the latch member 84 and has the lower end thereof abutting the arcuate part 98 of the lock plate 72. Once this has been accomplished, the operator of the tractor (not shown) may then again resume his position in the cab. Forward movement of the tractor with resultant forward movement of the coupler 12 will result in the reversal of the pivotal movement of the various components of the coupler which were outlined above, thus releasing the kingpin 14 and disconnecting the trailer 18 from the tractor (not shown).

Illustrated in Figures 9 and 10 is a modified form of coupler which is referred to in general by the reference numeral 102. The coupler 102 includes a coupler body 24. It also includes a coupler plate 104 which is identical with the coupler plate 60 with the exception that the bore 62 has been replaced by a much smaller bore 106. The coupler plate 104 includes a socket portion 108.

The coupler 102 also includes a lock plate which is referred to in general by the reference numeral 110. The lock plate 110 is generally circular in outline and has formed therein a socket portion 112. The socket portion 112 is aligned with the socket portion 108 and the coupler plate 104 and the lock plate 110 are secured together by a plug weld 114, which is best illustrated in Figure 9, the plug weld being formed in the bore 108. The lock plate 110 includes a flat part 116 which is disposed as a continuation of the socket portion 112 and a flat part 118 which is disposed normal to the flat part 116.

In order that the coupler plate 104 and the lock plate 110 may be mounted on the coupler body 24, there is provided a support bracket which is referred to in general by the reference numeral 120. The support bracket 120 includes a support plate 122 which directly underlies the lock plate 110. The support bracket 120 also includes an L-shaped cross-sectional retaining ring 123 which has an upper edge of a vertical flange 124 thereof secured to the underside of the coupler body 24 and a horizontal flange 126 which directly underlies the support plate 122.

As is best illustrated in Figure 10, the support plate 122 is circular in outline and includes a slot 128. The slot 128 is very similar in outline to the slot 30 and differs therefrom only in its width, the slot 128 being intended to accommodate the lower portion 20 of the kingpin 14. The slot 128 terminates in a seat portion 130.

The lock plate 110, when in a kingpin retaining position, will have the flat part 118 thereof engaged by the latch member 84 so as to lock it against rotation. Further, both the coupler plate 104 and the lock plate 110 will engage the enlarged upper portion 16 of the kingpin 14 to retain the king pin 14 in place. At the same time, the support plate 122 will engage the reduced lower portion 20 as well as the head 22, the support plate 122 limiting upward movement of the kingpin 14.

It is pointed out at this time that the coupler plate 60, the coupler spindle 64 and the lock plate 72 may be cast as an integral unit. When these parts are so formed, the support bracket 50 will be longitudinally split through the center of the bore 58 in order that the various parts of the coupler 12 may be assembled.

It will be readily apparent from the disclosure of the components of the coupler 102, that the coupler plate 104 and the lock plate 110 may be cast as a unit. No special modification of the support bracket 120 will be necessary to mount the part so formed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fifth wheel coupler comprising a coupler body, a kingpin slot in said coupler body, an opening in said coupler body immediately adjacent to and communicating with said slot, a coupler plate rotatably mounted in said opening and being engageable with a kingpin to lock the kingpin to said coupler body, a lock plate connected to said coupler plate for rotation therewith, and latch means carried by said coupler body selectively engaged with said lock plate to prevent rotation of said lock plate and said coupler plate, said coupler plate being of the same thickness as said coupler body and disposed coplanar therewith.

2. A fifth wheel coupler comprising a coupler body, a kingpin slot in said coupler body, an opening in said coupler body immediately adjacent to and communicating with said slot, a coupler plate rotatably mounted in said opening and being engageable with a kingpin to lock the kingpin to said coupler body, a lock plate connected to said coupler plate for rotation therewith, and latch means carried by said coupler body selectively engaged with said lock plate to prevent rotation of said lock plate and said coupler plate, said coupler plate and said lock plate having aligned sockets for receiving a kingpin.

3. A fifth wheel coupler comprising a coupler body, a kingpin slot in said coupler body, an opening in said coupler body immediately adjacent to and communicating with said slot, a coupler plate rotatably mounted in said opening and being engageable with a kingpin to lock the kingpin to said coupler body, a lock plate connected to said coupler plate for rotation therewith, and latch means carried by said coupler body selectively engaged with said lock plate to prevent rotation of said lock plate and said coupler plate, said coupler body having a stop portion projecting into said opening, said stop portion being coplanar with and engaging said coupler plate to limit the rotation thereof.

4. A fifth wheel coupler comprising a coupler body, a kingpin slot in said coupler body, an opening in said coupler body immediately adjacent to and communicating with said slot, a coupler plate rotatably mounted in said opening and being engageable with a kingpin to lock the kingpin to said coupler body, a lock plate connected to said coupler plate for rotation therewith, and latch means carried by said coupler body selectively engaged with said lock plate to prevent rotation of said lock plate and said coupler plate, said coupler plate having a kingpin socket portion formed therein, said slot terminating in a kingpin socket portion, said socket portions being in opposed relation and cooperating to hold a kingpin in position.

5. A fifth wheel coupler comprising a coupler body, a kingpin slot in said coupler body, an opening in said coupler body immediately adjacent to and communicating with said slot, a coupler plate rotatably mounted in said opening and being engageable with a kingpin to lock the kingpin to said coupler body, a lock plate connected to said coupler plate for rotation therewith, and latch means carried by said coupler body selectively engaged with said lock plate to prevent rotation of said lock plate and said coupler plate, said coupler plate having a kingpin socket portion formed therein, said slot terminating in a kingpin socket portion, said socket portions being in opposed relation and cooperating to hold a kingpin in position, said slot including a longitudinal straight entrance portion offset transversely relative to said second mentioned socket portion and connected thereto by a curved portion.

6. A fifth wheel coupler comprising a coupler body, a kingpin slot in said coupler body, an opening in said coupler body immediately adjacent to and communicating with said slot, a coupler plate rotatably mounted in said opening and being engageable with a kingpin to lock the kingpin to said coupler body, a lock plate connected to said coupler plate for rotation therewith, and latch means carried by said coupler body selectively engaged with said lock plate to prevent rotation of said lock plate and said coupler plate, said coupler plate having a kingpin socket portion formed therein, said slot terminating in a kingpin socket portion, said socket portions being in opposed relation and cooperating to hold a kingpin in position, a support bracket for said coupler plate and said lock plate, said support bracket being secured to said coupler body, said support bracket having a socket portion aligned with said coupler body socket portion.

7. A fifth wheel coupler comprising a coupler body, a kingpin slot in said coupler body, an opening in said coupler body immediately adjacent to and communicating with said slot, a coupler plate rotatably mounted in said opening and being engageable with a kingpin to lock the kingpin to said coupler body, a lock plate connected to said coupler plate for rotation therewith, and latch means carried by said coupler body selectively engaged with said lock plate to prevent rotation of said lock plate and said coupler plate, said coupler plate having a kingpin socket portion formed therein, said slot terminating in a kingpin socket portion, said socket portions being in opposed relation and cooperating to hold a kingpin in position, a support bracket for said coupler plate and said lock plate, said support bracket being secured to said coupler body, said support bracket being disposed intermediate said coupler plate and said lock plate, a coupler spindle extending between said coupler plate and said lock plate, said coupler spindle being journaled in said support bracket.

8. A fifth wheel coupler comprising a coupler body, a kingpin slot in said coupler body, an opening in said coupler body immediately adjacent to and communicating with said slot, a coupler plate rotatably mounted in said opening and being engageable with a kingpin to lock the kingpin to said coupler body, a lock plate connected to said coupler plate for rotation therewith, and latch means carried by said coupler body selectively engaged with said lock plate to prevent rotation of said lock plate and said coupler plate, said coupler plate having a kingpin socket portion formed therein, said slot terminating in a kingpin socket portion, said socket portions being in opposed relation and cooperating to hold a kingpin in position, a support bracket for said coupler plate and said lock plate, said support bracket being secured to said coupler body, said support bracket having a socket portion aligned with said coupler body socket portion, said lock plate having a socket portion aligned with said coupler plate socket portion.

9. A fifth wheel coupler comprising a coupler body, a kingpin slot in said coupler body, an opening in said coupler body immediately adjacent to and communicating with said slot, a coupler plate rotatably mounted in said opening and being engageable with a kingpin to lock the kingpin to said coupler body, a lock plate connected to said coupler plate for rotation therewith, and latch means carried by said coupler body selectively engaged with said lock plate to prevent rotation of said lock plate and said coupler plate, said coupler plate having a kingpin socket portion formed therein, said slot terminating in a kingpin socket portion, said socket portions being in opposed relation and cooperating to hold a kingpin in position, a support bracket for said coupler plate and said lock plate, said support bracket being secured to said coupler body, said support bracket being below said lock plate and engageable with a kingpin to limit vertical movement thereof.

10. A fifth wheel assembly comprising a kingpin and a coupler, said kingpin having an upper portion, a reduced lower portion, and a lower enlarged head, said coupler comprising a coupler body, an entrance slot in said coupler receiving said upper portion, an opening in said coupler body immediately adjacent to and communicating with said slot, a coupler plate rotatably mounted in said opening and being engaged with said upper portion to retain said kingpin in said slot, a lock plate connected to said coupler plate for rotation therewith, said lock plate being engaged with said kingpin, and latch means carried by said coupler body releasably engaging said lock plate and preventing rotation of said coupler plate and said lock plate to a kingpin releasing position.

11. A fifth wheel assembly comprising a kingpin and a coupler, said kingpin having an upper portion, a reduced lower portion, and a lower enlarged head, said coupler comprising a coupler body, an entrance slot in said coupler receiving said upper portion, an opening in said coupler body immediately adjacent to and communicating with said slot, a coupler plate rotatably mounted in said opening and being engaged with said upper portion to retain said kingpin in said slot, a lock plate connected to said coupler plate for rotation therewith, said lock plate being engaged with said kingpin, and latch means carried by said coupler body releasably engaging said lock plate and preventing rotation of said coupler plate and said lock plate to a kingpin releasing position, said coupler plate being of the same thickness as said coupler body and disposed coplanar therewith.

12. A fifth wheel assembly comprising a kingpin and a coupler, said kingpin having an upper portion, a reduced lower portion, and a lower enlarged head, said coupler comprising a coupler body, an entrance slot in said coupler receiving said upper portion, an opening in said coupler body immediately adjacent to and communicating with said slot, a coupler plate rotatably mounted in said opening and being engaged with said upper portion to retain said kingpin in said slot, a lock plate connected to said coupler plate for rotation therewith, said lock plate being engaged with said kingpin, and latch means carried by said coupler body releasably engaging said lock plate and preventing rotation of said coupler plate and said lock plate to a kingpin releasing position, said coupler plate having a kingpin socket portion formed therein, said slot terminating in a kingpin socket portion, said socket portions being in opposed relation and cooperating to hold said kingpin in position.

13. A fifth wheel assembly comprising a kingpin and a coupler, said kingpin having an upper portion, a reduced lower portion, and a lower enlarged head, said coupler comprising a coupler body, an entrance slot in said coupler receiving said upper portion, an opening in said coupler body immediately adjacent to and communicating with said slot, a coupler plate rotatably mounted in said opening and being engaged with said upper portion to retain said kingpin in said slot, a lock plate connected to said coupler plate for rotation therewith, said lock plate being engaged with said kingpin, and latch means carried by said coupler body releasably engaging said lock plate and preventing rotation of said coupler plate and said lock plate to a kingpin releasing position, said coupler plate having a kingpin socket portion formed therein, said slot terminating in a kingpin socket portion, said socket portions being in opposed relation and cooperating to hold said kingpin in position, a support bracket for said coupler plate and said lock plate, said support bracket being secured to said coupler body, said support bracket having a socket portion aligned with said coupler body socket portion.

14. A fifth wheel assembly comprising a kingpin and a coupler, said kingpin having an upper portion, a reduced lower portion, and a lower enlarged head, said coupler comprising a coupler body, an entrance slot in said coupler receiving said upper portion, an opening in said coupler body immediately adjacent to and communicating with said slot, a coupler plate rotatably mounted in said opening and being engaged with said upper portion to retain said kingpin in said slot, a lock plate connected to said coupler plate for rotation therewith, said lock plate being engaged with said kingpin, and latch means carried by said coupler body releasably engaging said lock plate and preventing rotation of said coupler plate and said lock plate to a kingpin releasing position, said coupler plate having a kingpin socket portion formed therein, said slot terminating in a kingpin socket portion, said socket portions being in opposed relation and cooperating to hold said kingpin in position, said slot including a longitudinal straight entrance portion offset transversely relative to said second mentioned socket portion and connected thereto by a curved portion.

15. A fifth wheel coupler comprising a coupler body, a kingpin slot in said coupler body, an opening in said coupler body immediately adjacent to and communicating with said slot, a coupler plate rotatably mounted in said opening and being engageable with a kingpin to lock the kingpin to said coupler body, a lock plate connected to said coupler plate for rotation therewith, and latch means carried by said coupler body selectively engaged with said lock plate to prevent rotation of said lock plate and said coupler plate, said coupler plate having an upper surface coplanar with the upper surface of said coupler body.

References Cited in the file of this patent

UNITED STATES PATENTS

| | | |
|---|---|---|
| 2,070,245 | Swift | Feb. 9, 1937 |
| 2,072,661 | Walther et al. | Mar. 2, 1937 |
| 2,212,708 | Fraser | Aug. 27, 1940 |
| 2,258,432 | Winn | Oct. 7, 1941 |